(12) United States Patent
Kori et al.

(10) Patent No.: US 6,526,510 B1
(45) Date of Patent: *Feb. 25, 2003

(54) SIGNAL REPRODUCING METHOD AND APPARATUS, SIGNAL RECORDING METHOD AND APPARATUS AND SIGNAL RECORDING SYSTEM

(75) Inventors: Teruhiko Kori, Kanagawa (JP); Tadashi Ezaki, Tokyo (JP); Akira Ogino, Tokyo (JP); Yuji Kimura, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/207,299

(22) Filed: Dec. 8, 1998

(30) Foreign Application Priority Data

Dec. 10, 1997 (JP) ............................................. 9-340252

(51) Int. Cl.⁷ .......................... H04L 9/00; H04N 7/167
(52) U.S. Cl. ..................... 713/176; 380/202; 380/203; 380/242; 380/226
(58) Field of Search .................. 713/176; 380/238–242, 380/202–203, 216–217

(56) References Cited

U.S. PATENT DOCUMENTS

| 5,323,464 A | * | 6/1994 | Elander et al. ............. 713/191 |
|---|---|---|---|
| 5,343,527 A | * | 8/1994 | Moore .......................... 713/179 |
| 5,379,345 A | * | 1/1995 | Greenberg .................. 455/2.01 |
| 5,574,787 A | * | 11/1996 | Ryan ............................. 380/201 |
| 5,610,980 A | * | 3/1997 | Johnson et al. ............. 713/189 |
| 5,613,004 A | * | 3/1997 | Cooperman et al. .......... 380/28 |
| 5,822,432 A | * | 10/1998 | Moskowitz et al. .......... 380/46 |
| 5,898,779 A | * | 4/1999 | Squilla et al. ............... 713/176 |
| 6,023,551 A | * | 2/2000 | Sugita et al. ................. 386/94 |
| 6,108,423 A | * | 8/2000 | Sako et al. .................. 380/203 |
| 6,112,008 A | * | 8/2000 | Sugita et al. ................. 386/94 |
| 6,175,627 B1 | * | 1/2001 | Petrovic et al. ............. 380/252 |
| 6,229,897 B1 | * | 5/2001 | Holthaus et al. ............ 380/270 |

* cited by examiner

*Primary Examiner*—Gilberto Barron
*Assistant Examiner*—Kambiz Zand
(74) *Attorney, Agent, or Firm*—Frommer Lawrence & Haug LLP; William S. Frommer; Dennis M. Smid

(57) ABSTRACT

A signal reproducing method and apparatus in which the generation limitation information, such as a token or a ticket, contained in digital data, is recorded in analog signals. A reproducing device 20 reproduces, from a source disc S, picture data etc having the superimposed copyright control information for copying limitation and a ticket representing the generation limitation information specifying the number of times of possible copying or reproduction. The reproducing device 20 converts the picture data etc into analog baseband signals and detects the ticket. The reproducing device 20 superimposes the detected ticket on audio signals by watermark processing to output the resulting analog baseband signals.

16 Claims, 7 Drawing Sheets

SIGNAL REPRODUCING METHOD AND APPARATUS, SIGNAL RECORDING METHOD AND APPARATUS AND SIGNAL RECORDING SYSTEM

BACKGROUND OF THE INVENTION

1. Field of the Invention

This invention relates to a signal reproducing method and apparatus, a signal recording method and apparatus and a signal recording system in which the copyright information is superimposed on picture or music data and control is performed on the basis of the copyright information.

2. Description of the Related Art

There has recently been proposed a method of prohibiting unauthorized copying of picture or music data, purveyed in a stored state on a recording medium or using a network as a transmission medium, by burying the copyright information in the data by watermark processing.

The watermark processing is the processing of burying the information as noise in a perceptually non-crucial portions present im the picture or music data, that is in the non-redundant portions with respect to the music or the picture. The copyright information, buried in the picture or music data by this watermark processing, can scarcely be removed, and can be retrieved even on filtering or data compression.

Among different items of the copyright information, thus buried by watermark processing in the picture or music data, there is the copyright control information.

This copyright control information is the information specifying whether the picture or music data recorded on a recording medium or transmitted over a transmission medium is "copy free" (copying possible), "one copy" (only one copying possible), "no more copy" (copying cannot be continued further) or "never copy" (copying is not permitted). The reproducing device or the recording device, which has detected this copyright control information, limits reproduction or recording for the picture or music data.

Among the items of the copyright control information, there is the information indicating "one copy", as described above. If the information indicating "one copy" is buried in the picture data etc, the user can copy from the source medium to another medium he or she owns. However, the information specifying "no more copy" is buried in the picture data etc recorded on the latter medium so that the user is prohibited from copying from this latter medium. Thus, the copyright control information is able to realize copying control to only one generation.

FIG. 1 shows a conventional optical disc system made up of an optical disc reproducing device 110 and an optical disc recording device 120. Referring to FIG. 1, the operation of rewriting the copyright control information from "one copy" to "no more copy" in case of copying picture data etc recorded on a source disc S to a rewritable disc RW is explained in detail.

The optical disc reproducing device 110 reproduces picture data and speech data recorded on the source disc S. In the picture data etc is buried the copyright control information reading "one copy" by watermark processing. The optical disc reproducing device 110 outputs; reproduced picture data etc at an output terminal 111 to send the data over a transmission medium 130 to the optical disc recording device 120.

The transmission medium 130 may be any suitable medium, such as communication cable, e.g., telephone line, bus line in a computer or a cable for AV. The picture data transmitted over the transmission medium 130 may be analog signals.

The optical disc recording device 120 receives the picture data etc transmitted over the transmission medium 130 at an input terminal 121. By a watermark (WM) detection unit 122, the optical disc recording device 120 detects the copyright control information superimposed on the picture data. Then, a watermark (WM) verification unit 123 verifies whether or not the copyright control information detected by the watermark (WM) detection unit 122 is "one copy". If the optical disc recording device 120 verifies that the copyright control information reading "one copy" is superimposed on the input picture data, a watermark (WM) rewriting unit 124 rewrites the copyright control information superimposed on the picture data to "no more copy".

The optical disc recording device 120 records the picture data, whose copyright control information has now been rewritten to "no more copy", on the rewritable disc RW by a recording unit 125.

If the optical disc recording device 120 detects "copy free" as the copyright control information, it allows the recording unit 125 to record directly the picture data on the rewritable disc RW, without rewriting the copyright control information. If the optical disc recording device 120 detects "never copy" as the copyright control information, it terminates the recording operation.

In the conventional optical disc system 100, as described above, change of the copyright control information from "one copy" to "no more copy" is done by the RW rewriting unit 124 of the optical disc recording device 120 by way of limiting the copying to only one generation.

Meanwhile, the rewriting of the copyright control information from "one copy" to "no more copy" needs to be performed by a recording device owned by the user. However, in watermark processing, it is usually difficult to remove or rewrite the copyright control information buried in picture data etc. Although it is retained to be feasible to bury the new information by, as it were, multiple writing, on the copyright control information already buried by watermark processing in the picture data etc. This, however, leads to obstruction to the visual or auditory system, while producing undesirable interference between the new information and the old information.

For reinforcing the above-described method of burying the copyright control information in the picture data by such watermark processing, there has recently been proposed a method of writing the information termed a token or a ticket, specifying the generation limiting information indicating the number of times of possible copying or reproduction, on the so-called user area of digital data, by way of generation limitation.

If a datastream, containing digital picture data etc, is a main stream, the token or ticket is written in a sub-stream containing the control information etc of data contained in this main stream. If the picture data etc is compressed in accordance with the MPEG system and recorded on a recording medium or transmitted in this compressed form, the token or ticket is written in a header part or in the user area of this MPEG stream. In addition, the token or the ticket is written in an encrypted form for prevention of unauthorized duplication.

The token is the information specifying that one-generation copying is possible and is made up at least of one bit. If this token is written in the user area etc of the picture data etc, the user is able to copy from the source medium to an other medium in his or her possession. However, on this other recording medium, on which copying has now been made, data is recorded subject to erasure or destruction of the token. This prohibits the user from copying from this other recording medium. Therefore, this token renders it possible to control the copying to only one generation.

The ticket is digital data specifying the number of copying generations. Each time picture data etc is copied for a recording medium to another, the ticket has its value decremented to supervise the number of copying generations. Of course, this ticket is not incremented in its value. If this ticket is already written in the user area etc of the picture data etc, the user is able to copy from the recording medium carrying the recorded picture data to another recording medium in his or her possession. On the latter recording medium, on which the picture data has now been recorded, the ticket is decremented in its value by one, so that the number of possible copying generations in case of copying from this other recording medium is decremented by one. Thus, the ticket renders it possible to limit the number of generations of possible duplication.

This ticket may also be set to indicate not only the number of possible copying generations but also the number of possible reproducing generations.

If used in conjunction with the above copyright control information, the ticket denotes, by its combination, the following contents:

TABLE 1

| ticket | watermark | contents |
|---|---|---|
| three buses | one copy | one copy |
| two buses | one copy (no distinction) | no more copy |
| one bus | "never copy" or "one copy" | never-copy (only reproduction) |
| none (inclusive of 0 bus) | don't care, not viewed | not reproducible |

The processing for generation limitation of digital and speech data, in case the token or the ticket is already recorded in the user area and the copyright control information is superimposed by watermark processing on the picture or speech data, is explained specifically.

First, an optical disc system, in which picture data etc is reproduced from the source disc S, having the token recorded thereon, is explained.

FIG. 2 shows a block diagram of an authoring device 200, for generating the source disc S, and a conventional optical disc system for recording picture data etc reproduced from the source disc S on a rewritable disc RW.

The authoring device 200 includes a reproducing unit 201, for reproducing a master tape, having recorded thereon original signals for picture data and speech data for recording on the source disc S, a watermark (WM) processing unit 202, for superimposing the copyright control information on the reproduced picture data etc using watermark processing, an MPEG encoder 203, for compressing data in accordance with the MPEG system, a token generator 204 for generating the tokens, and a synthesis unit 205 for writing the generated token in a user area etc for compressed picture data.

The reproducing unit 201 reproduces the picture and speech data recorded on the master tape to send the reproduced data to the watermark (WM) processing unit 202.

The watermark (WM) processing unit 202 superimposes the copyright control information, set by the contents purveyor, on the picture or speech data, using the watermark processing. Here, the watermark (WM) processing unit 202 superimposes the information reading "one copy" as the copyright control information by watermark processing on the picture data. This watermark (WM) processing unit 202 sends the picture data etc to the MPEG encoder 203.

The MPEG encoder 203 compresses the picture data etc, having the copyright information superimposed thereon, by the MPEG system, to generate a compressed picture stream, which is sent to the synthesis unit 205.

The token generator 204 generates a token based on the copyright control information denoting "one copy" as set by the contents purveyor. The generated token is sent to the synthesis unit 205.

The synthesis unit 205 writes the token sent thereto in a user area of the MPEG stream. This synthesis unit 205 buries the copyright control information specifying "one copy" by watermark processing, while generating a stream in the user area of which is written the token.

The authoring device 200 writes a stream outputted by the synthesis unit 205 on the optical disc to produce source discs S distributed in large quantities among the users.

The conventional optical disc system 250 is made up of an optical disc reproducing device 260, an optical disc recording device 270 and a transmission medium 280 for analog interconnection therebetween. In this optical disc system, the optical disc reproducing device 260 reproduces picture data and speech data from the source disc S purveyed from the authoring device 200, whilst the optical disc recording device 270 records the picture and speech data reproduced by the optical disc reproducing device 260 on the rewritable disc RW. Also, in the present optical disc system 250, the optical disc reproducing device 260 and the optical disc recording device 270 are interconnected by the transmission medium 280 on which is transmitted digital data.

The optical disc reproducing device 260 expands the compressed picture data recorded on the source disc S to reproduce picture data etc. The picture data etc has the copyright control information reading "one copy" buried therein by watermark processing, while having the token written in its user area. The optical disc reproducing device 260 outputs reproduced picture data etc and the token at an output terminal 261 to send the data etc over the transmission medium 280 to the optical disc recording device 270.

There is no restriction to the transmission medium 280, which may, for example, be a communication cable, such as telephone line, a bus line in a computer or a cable for AV. The data transmitted on the transmission medium 280 is digital data because the token is transmitted thereon.

The optical disc recording device 270 includes an input terminal 271, a watermark (WM) detection unit 272, a token detection unit 273, a verification unit 274, a token rewriting unit 275 and a recording unit 276.

The input terminal 271 is fed with digital picture and audio data transmitted on the transmission medium 280.

The watermark (WM) detection unit 272 is fed with the input picture data etc to detect the copyright control information superimposed on these picture data etc to send the contents specified by the copyright control information to the verification unit 274.

The token detection unit 273 is fed with input picture data etc to detect the token written in the user area etc of the picture data to advise the verification unit 274 of the presence or absence of the token.

The verification unit 274 verifies whether the copyright control information specifies "one copy" and whether or not there exists the token. If the copyright control information for "one copy" is superimposed on the picture data etc and if such token exists, the verification unit 274 causes the token rewriting unit 275 to erase the token written in the user area of the picture data. At this time, the copyright control information need not be rewritten and may remain to be "one copy".

The recording unit 276 is fed from the token rewriting unit 275 with picture data from which has been erased. The recording unit 276 records the supplied picture data on the rewritable disc RW.

In the present optical disc recording device 270, if "copy free" is detected as the copyright control information but no token has been detected, the optical disc recording device 270 is able to terminate the recording operation.

By employing the token, the optical disc system 250 is able to perform one-generation control from "one copy" to "no more copy" without rewriting the copyright control information superimposed by watermark processing.

FIG. 3 shows an authoring device 300 for generating a source disc S, and a conventional optical disc system for recording picture data etc reproduced from the source disc S on the rewritable disc RW.

The authoring device 300 includes a reproducing unit 301 for reproducing a master tape, having recorded thereon picture and speech data for recording on the source disc S, a WM superimposition unit 302 for superimposing the copyright control information by watermark processing on the reproduced picture data etc, and an MPEG encoder 303 for compressing the data in accordance with the MPEG system. The authoring device 300 also includes a ticket generating unit 304 for generating a ticket, and a synthesis unit 305 for writing a ticket generated in the user area of, for example, the compressed picture data.

The WM superimposition unit 302 superimposes the copyright control information, as set by the contents purveyor, on the picture data or speech data. Here, the WM superimposition unit 302 superimposes the information reading "one copy" as the copyright control information on the picture data by watermark processing. The WM superimposition unit 302 sends these picture data etc to the MPEG encoder 303.

This MPEG encoder 303 compresses picture data etc, having the copyright a control information superimposed thereon, by the MPEG system, to generate a compressed picture stream, which is sent to the synthesis unit 305.

The ticket generating unit 304 generates a ticket for a predetermined pass, based on the pass of the ticket as set by the contents purveyor. The relation between the ticket pass and the copyright control information is that shown in Table 1 above. It is assumed that the ticket generating unit 304 has three passes designated by the contents purveyor and generates corresponding tickets. The so-generated tickets are sent to the synthesis unit 305.

This synthesis unit 305 writes the ticket sent thereto in the user area of the MPEG stream. The synthesis unit 305 buries the copyright information reading "one copy" by watermark processing, while generating a stream having the ticket denoting three passes written therein in the user area.

The above-described authoring device 300 writes an output stream of the synthesis unit 305 to produce source discs S distributed in large quantities among users.

A conventional optical disc system 350 includes an optical disc reproducing device 360, an optical disc recording device 370 and a transmission medium 380 for analog interconnection therebetween. In the present optical disc system, the optical disc reproducing device 360 reproduces picture and speech data from the source disc S purveyed by the authoring device 300, whilst the optical disc recording device 370 records the picture and speech data, reproduced by the optical disc reproducing device 360, on the rewritable disc RW. Also, in this optical disc system 350, the optical disc reproducing device 360 and the optical disc recording device 370 are interconnected by the transmission medium 380, on which is transmitted digital data.

The optical disc reproducing device 360 expands the compressed picture data recorded on the source disc S to reproduce picture data etc. In the picture data etc, there is buried the copyright control information reading "one copy" by watermark processing while the ticket specifying the three passes is written in its user area. The optical disc reproducing device 360 outputs the reproduced picture data etc and a ticket at an output terminal 361 to send the outputted data and ticket over the transmission medium 380 to the optical disc recording device 370.

There is no restriction to the transmission medium 380, which may, for example, be a communication cable, such as telephone line, a bus line in a computer or a cable for AV. The data transmitted on the transmission medium 380 is digital data because the ticket is transmitted thereon.

The optical disc recording device 370 includes an input terminal 371, a watermark (WM) detection unit 372, a ticket detection unit 373, a verification unit 374, a ticket rewriting unit 375 and a recording unit 376.

The input terminal 371 is fed with digital picture and audio data transmitted on the transmission medium 380.

The watermark (WM) detection unit 372 is fed with the input picture data etc to detect the copyright control information superimposed on these picture data etc to send the contents specified by the copyright control information to the verification unit 374.

The ticket detection unit 373 is fed with input picture data etc to detect the ticket written in the user area etc of the picture data to advise the verification unit 374 of the presence or absence of the ticket. Here, a three-pass ticket is detected.

The verification unit 374 verifies whether or not the copyright control information denotes "one copy" and how many there are the passes of the ticket. If the copyright control information reading "one copy" is superimposed on the picture data etc and there is written a three-pass ticket, the verification unit 374 causes the token rewriting unit 375 to rewrite the ticket written in the user area of the picture data to a two-pass ticket. Meanwhile, the copyright control information need not be rewritten, that is may remain to be "one copy".

To the recording unit 376, there is sent picture data etc, in which is the ticket sent from the token rewriting unit 375 is changed to the two-pass ticket. The recording unit 376 records the sent picture data on the rewritable disc RW.

In the present optical disc recording device 370, if "one copy" is detected as the copyright control information, the recording operation is discontinued if the 0-pass, 1-pass or 2-pass ticket is detected.

In the optical disc system 350, as described above, generation management can be performed by employing a ticket, without rewriting the copyright control information superimposed by watermark processing.

However, since the above-mentioned token or ticket is digital data written in, for example, the user area of the picture data, the digital data is depleted if the analog baseband signals are outputted from the optical disc reproducing device. That is, in the case of digital data, sufficient copyright protection can be realized by having the token or the ticket contained therein by watermark processing, this merit is lost if the data is converted into the analog baseband signals.

SUMMARY OF THE INVENTION

It is therefore an object of the present invention to provide a signal reproducing method and apparatus, a signal recording method and apparatus and a signal recording system in which, even if the digital data, in which the generation limitation information specifying the number of times of possible copying or reproduction, such as a token or a ticket, is transmitted in the form of a user sub-stream of a user area etc, is converted into analog signals, it is possible to perform control based on the generation limitation information.

In one aspect, the present invention provides a signal reproducing apparatus including receiving/reproducing means for receiving or reproducing digital data transmitted via a transmission medium or recorded on a recording medium, the digital data containing a main stream and a sub-stream, the main stream being original signals having the copyright control information for copying limitation superimposed thereon by watermark processing and the sub-stream being the generation limitation information specifying the number of times of possible copying or reproduction, conversion means for converting the original signals into analog baseband signals, generation limitation information superimposition means for detecting the generation limitation information for superimposing the detected generation limitation information on the analog baseband signals, and outputting means for outputting the analog baseband signals having the generation limitation information superimposed thereon.

In this signal reproducing device, analog baseband signals, having the generation limitation information contained in the sub-stream superimposed thereon, are outputted.

In another aspect, the present invention provides a signal recording apparatus including input means supplied with analog baseband signals, the analog baseband signals being original signals having the copyright limitation information for copying limitation superimposed thereon by watermark processing and on which is superimposed the generation limitation information specifying the number of times of possible copying or reproduction, recording means for recording the analog baseband signals on the recording medium, copyright control information detection means for detecting the generation limitation information, generation limitation information detection means for detecting the generation limitation information, generation limitation information superimposition means for superimposing the generation limitation information on abs for recording, and recording limiting means for verifying, based on the copyright control information detected by the copyright control information detection means and on the generation limitation information detected by the generation limitation information detection means, whether or not the original signals are recordable on the recording medium. The recording limiting means terminates the recording operation by the recording means if the original signals are verified to be unrecordable. The recording limiting means permits the recording operation to be performed by the recording means, if the original signals are verified to be recordable, in which case the generation limitation information updated by one generation by the generation limitation information superimposing means is superimposed on the analog baseband signals.

In this signal recording device, analog baseband signals, having the generation limitation information contained in the sub-stream superimposed thereon, are received to perform copyright management.

In a further aspect, the present invention provides a signal recording system including a signal reproducing apparatus including receiving/reproducing means for receiving or reproducing digital data transmitted via a transmission medium or recorded on a recording medium, the digital data containing a main stream and a sub-stream, the main stream being original signals having the copyright control information for copying limitation superimposed thereon by watermark processing and the sub-stream being the generation limitation information specifying the number of times of possible copying or reproduction, conversion means for converting the original signals into analog baseband signals, generation limitation information superimposition means for detecting the generation limitation information for superimposing the detected generation limitation information on the analog baseband signals and outputting means for outputting the analog baseband signals having the generation limitation information superimposed thereon, and a signal recording apparatus including input means supplied with analog baseband signals from output means of the reproducing apparatus, recording means for recording the analog baseband signals on the recording medium, copyright control information detection means for detecting the generation limitation information, generation limitation information detection means for detecting the generation limitation information, second generation limitation information superimposition means for superimposing the generation limitation information on analog baseband signals for recording, and recording limiting means for verifying, based on the copyright control information detected by the copyright control information detection means and on the generation limitation information detected by the generation limitation information detection means, whether or not the original signals are recordable on the recording medium. The recording limiting means terminates the recording operation by the recording means if the original signals are verified to be unrecordable, while permitting the recording operation to be performed by the recording means if the original signals are verified to be recordable, in which case the generation limitation information updated by one generation by the second generation limitation information superimposing means is superimposed on the analog baseband signals.

In this signal recording device, analog baseband signals, having the generation limitation information contained in the sub-stream superimposed thereon, are outputted to perform copyright management.

In a further aspect, the present invention provides a signal reproducing method including receiving or reproducing digital data transmitted via a transmission medium or recorded on a recording medium, the digital data containing a main stream and a sub-stream, the main stream being original signals having the copyright control information for copying limitation superimposed thereon by watermark processing and the sub-stream being the generation limitation information specifying the number of times of possible copying or reproduction, converting the original signals into analog baseband signals, detecting the generation limitation information for superimposing the detected generation limitation information on the analog baseband signals, and outputting the analog baseband signals having the generation limitation information superimposed thereon.

In this signal recording method, analog baseband signals, having the generation limitation information contained in the sub-stream superimposed thereon, are outputted.

In a further aspect, the present invention provides a signal recording method including receiving analog baseband signals as an input, the analog baseband signals being original signals on which the copyright limitation information for copying limitation is superimposed by watermark processing and on which the generation limitation information specifying the number of times of possible copying or reproduction is superimposed, detecting the copyright control information from the analog baseband signals, detecting the generation limitation information from the analog baseband signals, and verifying, based on the copyright control information and on the generation limitation information, whether or not the original signals are recordable on a recording medium. The recording operation by the recording means is terminated if the original signals are verified to be unrecordable, while the recording operation is permitted to be performed if the original signals are verified to be recordable, with the generation limitation information updated by one generation being then superimposed on the analog baseband signals.

In this signal recording method, analog baseband signals, having the generation limitation information contained in the sub-stream superimposed thereon, are received to perform copyright management.

In yet another aspect, the present invention provides a signal recoding method including receiving or reproducing digital data transmitted via a transmission medium or recorded on a recording medium, the digital data containing a main stream and a sub-stream, the main stream being original signals having the copyright control information for copying limitation superimposed thereon by watermark processing and the sub-stream being the generation limitation information specifying the number of times of possible copying or reproduction, converting the original signals into analog baseband signals, detecting the generation limitation information and superimposing the detected generation limitation information on the analog baseband signals, transmitting the analog baseband signals having the generation limitation information superimposed thereon, receiving the analog baseband signals having the transmitted generation limitation information superimposed thereon, detecting the copyright control information from the received analog baseband signals and verifying, based on the copyright control information and on the generation limitation information, whether or not the original signals are recordable on a recording medium. The recording operation by the recording means is terminated if the original signals are verified to be unrecordable. The recording operation is permitted to be performed if the original signals are verified to be recordable, with the generation limitation information updated by one generation being then superimposed on the analog baseband signals.

In this signal recording method, analog baseband signals, having the generation limitation information contained in the sub-stream superimposed thereon, are outputted to perform copyright management of these signals.

According to the present invention, even if the digital data, in which the generation limitation information, indicating the number of times of copying or reproduction, such as a token or a ticket, is transmitted in a sub-stream, such as a user area, is converted into analog baseband signals, it is possible to output analog data that can be controlled on the basis of the generation limitation, while management concerning copyright protection can be performed on the basis of these analog baseband signals. Thus, copyright protection of the original signals can be achieved with high safety.

Also, according to the present invention, the generation limitation information can be superimposed on the analog baseband signals without obstructing or interfering with the copyright information superimposed by watermark processing.

DESCRIPTION OF THE PREFERRED EMBODIMENTS

Figure 1:
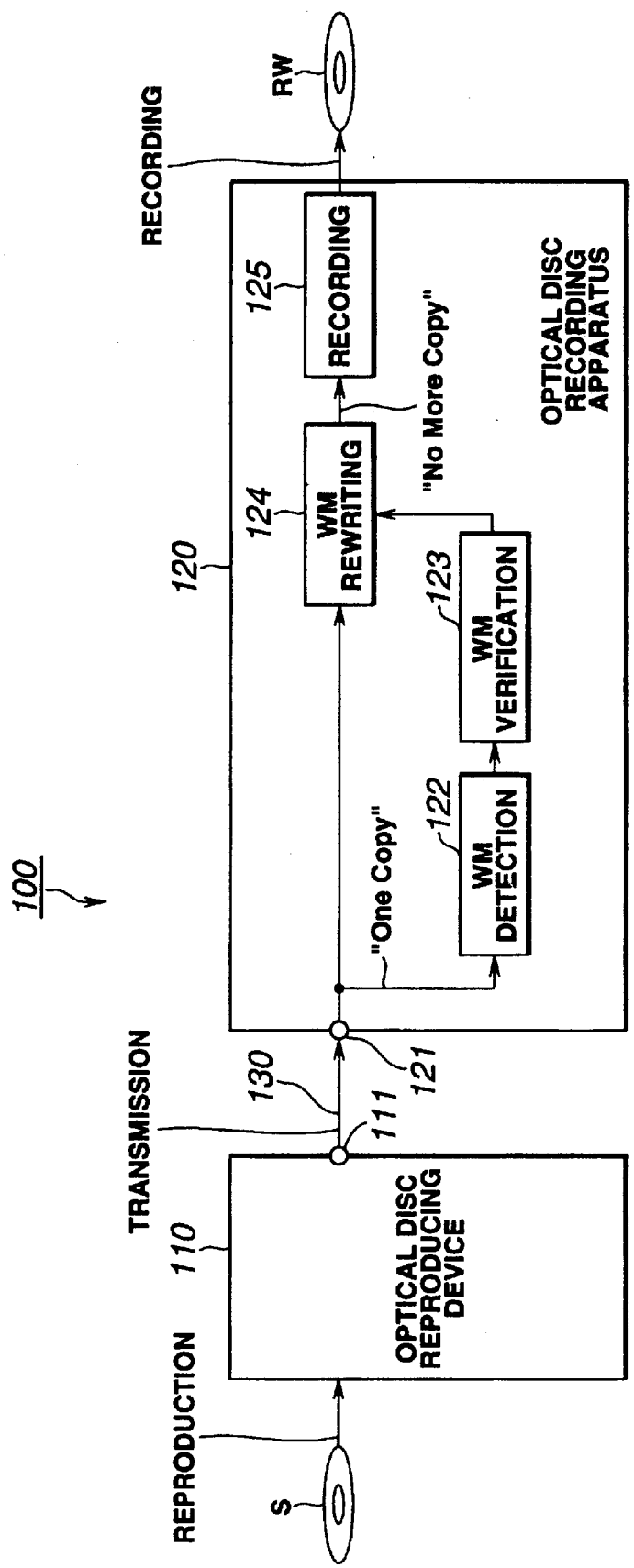
FIG. 1 s a block diagram of a conventional optical disc system for performing copyright control by watermark processing.
Figure 2:
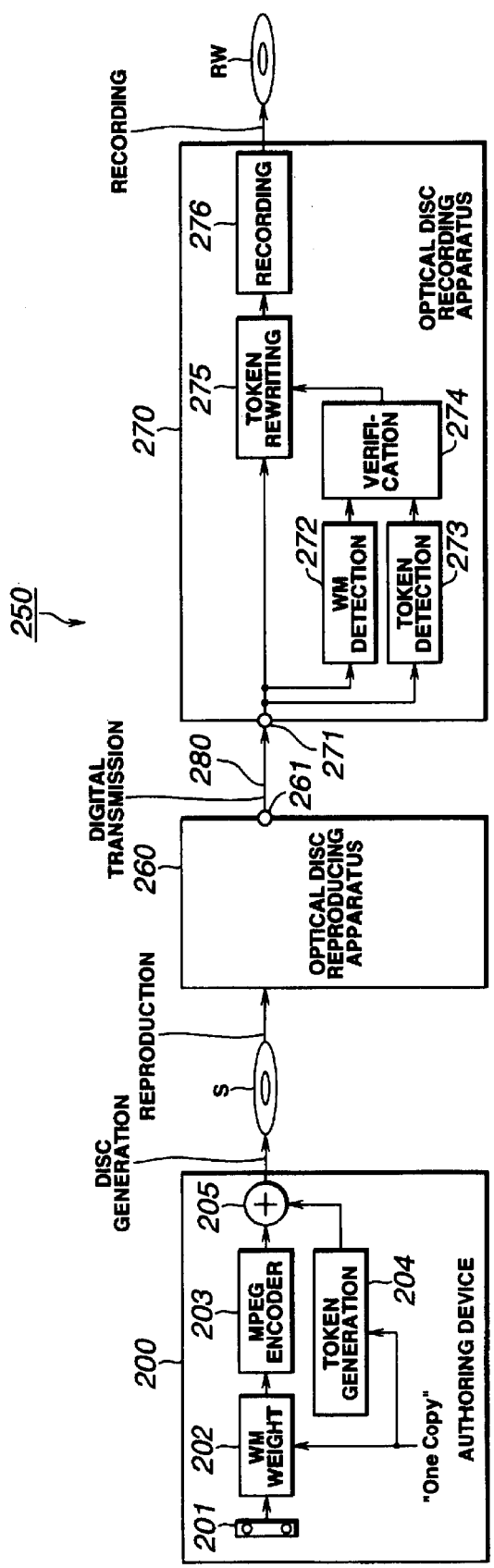
FIG. 2 is a block diagram showing a conventional optical disc system for performing copyright control by a token.
Figure 3:
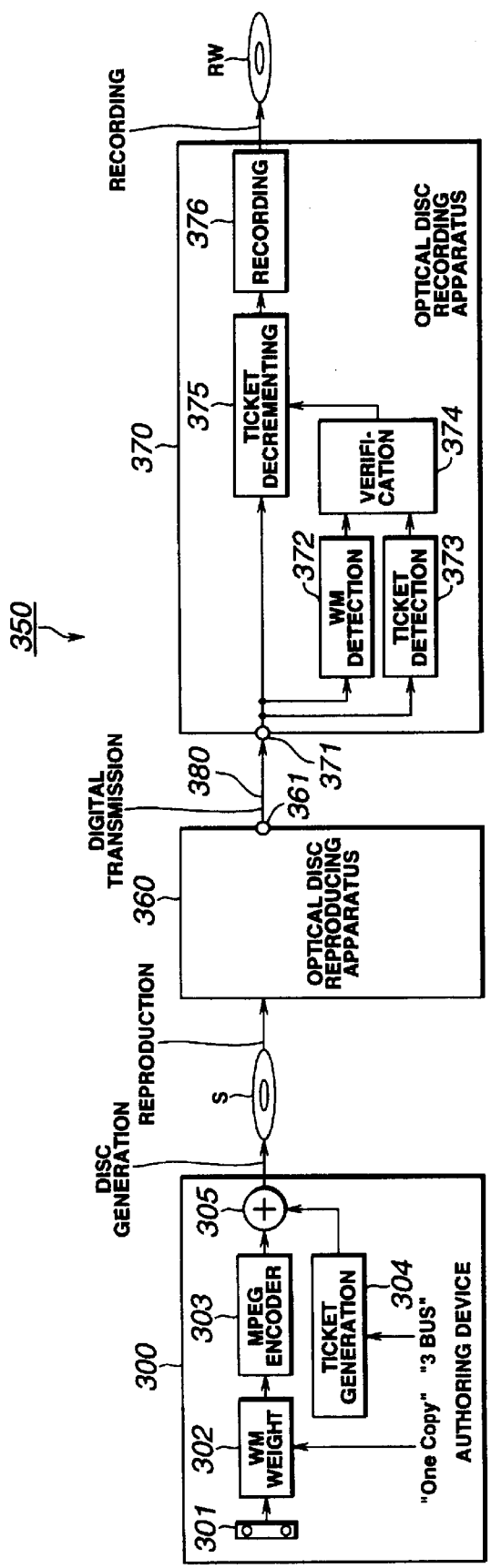
FIG. 3 is a block diagram showing a conventional optical disc system for performing copyright control by a ticket.

Referring to the drawings, first to fourth embodiments of the optical disc system according to the present invention will be explained in detail.

The optical disc system, according to the first to fourth embodiments, now to be explained, is such a system which reproduces picture data and speech data from an optical disc as a source disc S, transmits the picture and speech data between a reproducing device and a recording device in an analog form, and records the transmitted data on a rewritable disc RW which is a read-write optical disc. To the optical disc system, according to any of these first to fourth embodiments, a source disc S, in the user area of which is already written a ticket and on which are already recorded digital picture data and speech data, having the copyright control information superimposed thereon by watermark processing, is furnished from an authoring device.

The optical disc system according to the first embodiment is now explained.

Figure 4:
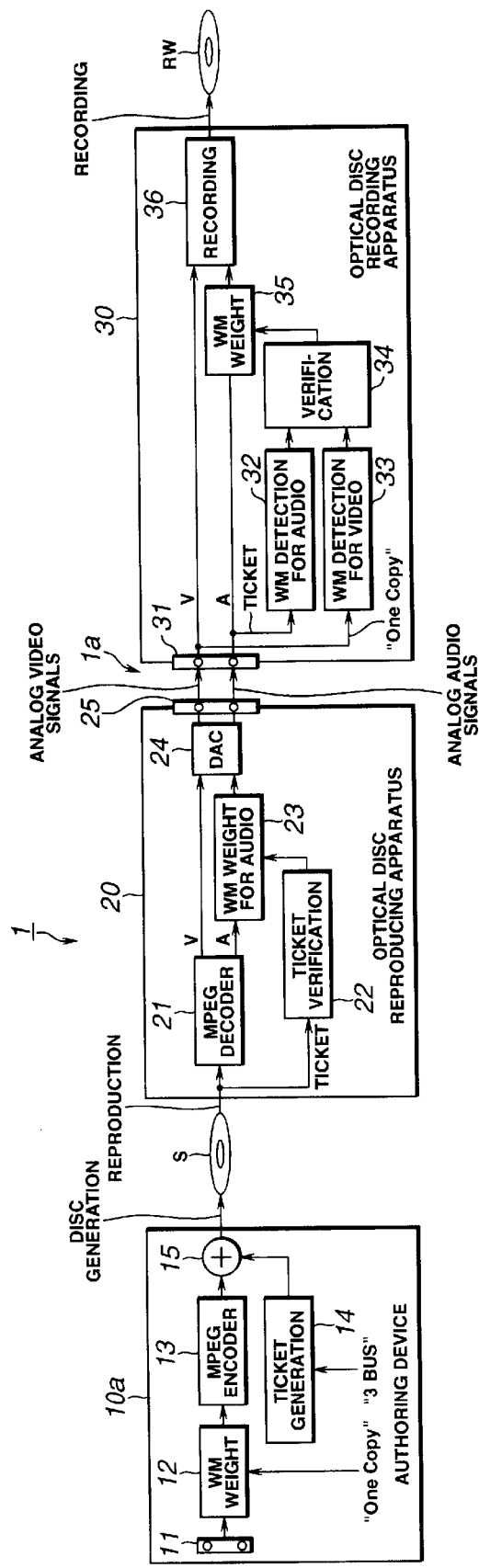
FIG. 4 is a block diagram of an optical disc system according to a first embodiment of the present invention.

FIG. 4 shows a block diagram showing an authoring device 10a, for generating the source disc S, and an optical disc system 1 of the first embodiment for reproducing the source disc S and for recording the reproduced picture data on the rewritable disc RW.

The authoring device 10a includes a reproducing unit 11 for reproducing a master disc, on which are recorded original signals of the picture and speech data for recording on the source disc S, a watermark superimposing unit 12 (WM superimposing unit) for superimposing the copyright control information on the reproduced picture data by watermark processing, a ticket generating unit 14 for generating a ticket of a preset pass and a synthesis unit 15 for writing the generated ticket in the user area etc of the compressed picture data.

The reproducing unit 11 reproduces the picture and speech data recorded on the master tape to send the reproduced data to the watermark superimposing unit 12.

The watermark superimposing unit 12 superimposes the copyright control information as set by the contents purveyor on the picture data or on the speech data. Here, the watermark superimposing unit 12 superimposes the information reading "one copy" on the picture data as the copyright control information by watermark processing. The watermark superimposing unit 12 sends the picture data etc to the MPEG encoder 13.

The MPEG encoder 13 compresses the picture data, having the copyright control information superimposed thereon, by the MPEG system, to send the resulting compressed picture stream to the synthesis unit 15.

The ticket generating unit 14 generates ticket data of a pre-set pass, based on the pass of the ticket as set by the contents purveyor. The relation between the ticket pass and the copyright control information is that shown in Table 1 above. It is assumed that the ticket generating unit 14 has three passes designated by the contents purveyor and generates corresponding ticket data. The so-generated ticket data are sent to the synthesis unit 15.

The synthesis unit 15 writes the ticket data sent thereto in the user area of the MPEG stream. The copyright control information reading "one copy" is buried in the picture data by the synthesis unit 15 and simultaneously a stream having 3-pass ticket data written in the user area is generated.

The above-described authoring device 10a writes an output stream of the synthesis unit 15 on the optical disc to generate source discs S distributed in large quantities among the users.

The relation between the copyright control information as set for the watermark superimposing unit 12 and the numbers of passes of the tickets as set for the ticket generating unit 14 is not limited to that shown in the above Table 1.

The optical disc system 1 is made up of an optical disc reproducing device 20, an optical disc reproducing device 30 and a transmission medium 1a for analog interconnection therebetween. In this optical disc system 1, the optical disc reproducing device 20 reproduces the picture data and the audio data from the source disc S furnished by the authoring device 10a, while the optical disc recording device 30 records the picture data and the speech data reproduced by the optical disc reproducing device 20 on the rewritable disc RW. Also, with the present optical disc system 1, the optical disc reproducing device 20 and the optical disc recording device 30 are interconnected by the transmission medium 1a, on which are transmitted analog baseband video signals and analog baseband audio signals. In this optical disc system, the supplied analog video and audio signals are copyright-controlled by the optical disc recording device 30.

The optical disc reproducing device 20 includes an MPEG decoder 21, a ticket verification unit 22, an audio watermark (WM) superimposition unit 23, a digital/analog converter (DAC) 24 and an output terminal 25.

The MPEG decoder 21 is fed with data reproduced from the source disc S and compressed in accordance with the MPEG system. The MPEG decoder 21 expands the compressed picture data and the compressed audio data, recorded on the source disc S, to generate digital baseband picture data and digital baseband speech data. In this expanded picture data, there is buried the copyright control information reading "one copy" by watermark processing.

The ticket verification unit 22 is fed with data reproduced from the source disc S and which is compressed by the MPEG system. The ticket verification unit 22 detects the ticket data written in the user area of the MPEG stream to verify the pass contents. Here, the three-pass ticket is written in the user area.

The audio WM superimposition unit 23 is fed with speech data decoded by the MPEG decoder 21 and the information on the number of passes of the ticket verified by the ticket verification unit 22. This audio WM superimposition unit 23 superimposes the ticket information on the speech data by watermark processing.

To the DAC 24, there are supplied the digital picture data and the digital speech data from the MPEG decoder 21 and the audio WM superimposition unit 23. The DAC 24 converts the digital picture and speech data into analog baseband signals to generate the analog video and audio signals. The analog video and audio signals, converted by this DAC 24, are sent to the output terminal 25, from which it is transmitted to the transmission medium 1a.

The transmission medium 1a may, for example, be a communication cable, such as a telephone line, an AV able etc and is a medium designed to transmit analog signals.

Thus, the optical disc reproducing device 20 sends the analog baseband video and audio signals over the transmission medium 1a to the optical disc recording device 30. There is superimposed the copyright control information by watermark processing on the video signals transmitted from this optical disc reproducing device 20. Also, there is superimposed the ticket information by watermark processing on the audio signals transmitted from the optical disc reproducing device 20.

Thus, with the present optical disc reproducing device 20, the ticket recorded as digital data is superimposed by watermark processing on the speech signals and converted into the signal configuration that can be transmitted as analog signals.

On the other hand, the optical disc reproducing device 30 includes an input terminal 31, an audio watermark (WM) detection unit 32, a video watermark (WM) detection unit 33, a verification unit 34, a watermark (WM) detection/re-encoding unit 35, and a recording unit 36.

To the input terminal 31 are sent video and audio signals transmitted over the transmission medium 1a.

The audio watermark (WM) detection unit 32, fed with input audio signals, detects the ticket data superimposed on the audio signals by watermark processing and the number of passes indicated on the ticket data to send the detected results to the verification unit 34.

The video watermark (WM) detection unit 33, fed with the input video signals, detects the copyright control information, superimposed on these video signals, by watermark processing, and the contents indicated by the copyright control information, to send the results of detection to the verification unit 34.

The verification unit 34 verifies whether the copyright information indicates "one copy" and whether or not the number of the passes of the ticket is three. If the copyright control information reading "one copy" is superimposed on the video signals, and if the three-pass ticket is superimposed on the audio signals, the verification unit 34 decrements the number of the ticket passes by one to send the resulting pass information to a watermark (WM) superimposition unit 35.

The watermark (WM) superimposition unit 35 rewrites the ticket superimposed on the audio signals from a three-pass ticket to a two-pass ticket. The copyright control information is not rewritten and hence is "one copy" as before.

The recording unit 36 is fed with video signals entering the input terminal 31 and with audio signals fed from the watermark (WM) superimposition unit 35. The recording unit 36 records the video signals, having the copyright control information reading "one copy" superimposed thereon, and audio signals, having the two-pass ticket data superimposed thereon, on the rewritable disc RW.

In the present optical disc recording device 30, if "copy free" is detected as the copyright control information, this copyright control information is directly recorded on the rewritable disc RW, without rewriting the information. If "never copy" is detected as the copyright control information, the recording operation is terminated. On the other hand, if "one copy" is detected as the copyright control information, and a two-pass, one-pass or zero-pass ticket for example, is detected, the recording operation is terminated, as indicated by the contents shown in Table 1.

The signals recorded on the rewritable disc RW may be digital data or analog data. If the data recorded on the rewritable disc RW is digital data, the ticket data updated by the watermark (WM) superimposition unit 35 may be superimposed thereon to write the data in the digital data user area or sub-codes. Alternatively, the three-pass ticket data superimposed on the audio signals may be removed to write the updated two-pass ticket data only in the user area or in the sub-codes.

Thus, by rewriting the three-pass ticket superimposed on the audio signals into two-pass data and by recording the resulting two-pass data on the rewritable disc RW, it is possible with the optical disc recording device 30 to perform generation control of the transmitted analog baseband signals.

With the present first embodiment of the optical disc reproducing device 1, generation control may be performed even if picture data etc having the ticket information written as digital data is converted into analog baseband signals.

The signals on which to superimpose the ticket may be other than audio signals, provided that there occurs no interference of the watermark processing with other watermark processing. For example, if the watermark processing used for superimposing the ticket is compatible with the watermark processing used for superimposing the copyright control information, the ticket may also be superimposed on the video signals.

Figure 5:
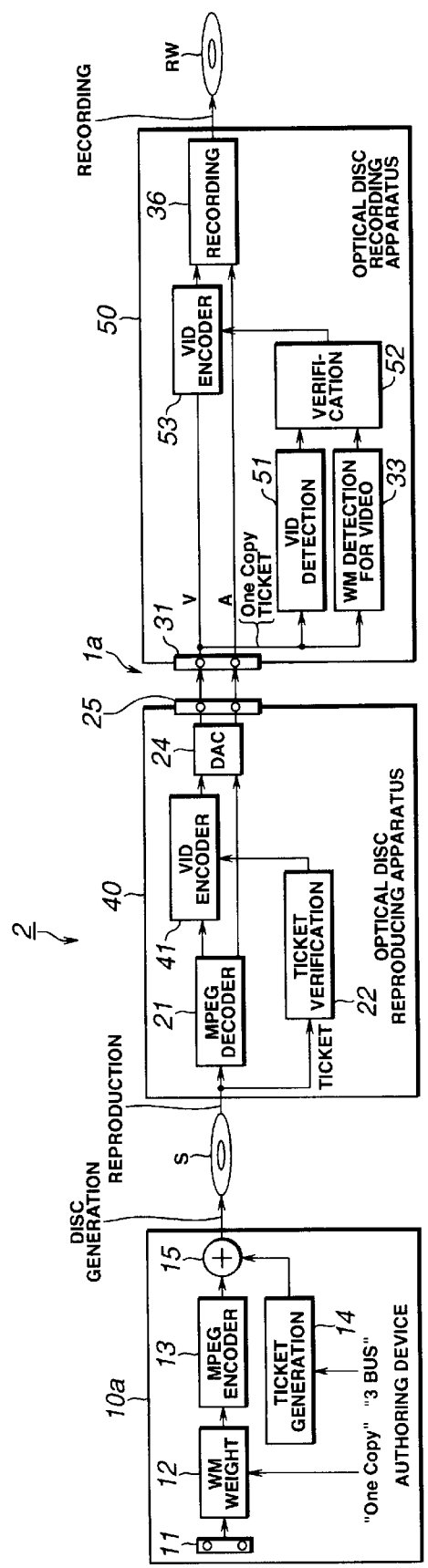
FIG. 5 is a block diagram of an optical disc system according to a second embodiment of the present invention.

The optical disc system of the second embodiment is hereinafter explained with reference to FIG. 5.

In the following description of the second embodiment of the optical disc system, the parts or components which are the same as those of the above-described first embodiment of the optical disc system are not explained specifically. The same applies for the optical disc systems of the third and fourth embodiments.

The authoring device 10a writes an output stream of the synthesis unit 15 on the optical disc to produce source discs S distributed in large quantities among the users.

The optical disc system 2 is made up of an optical disc reproducing device 40, an optical disc reproducing device 50 and a transmission medium 1a for analog interconnection therebetween. In this optical disc system 2, the optical disc reproducing device 40 reproduces the picture data and the audio data from the source disc S furnished by the authoring device 10a, while the optical disc recording device 50 are records the picture data and the speech data reproduced by the optical disc reproducing device 40 on the rewritable disc RW. Also, with the present optical disc system 2, the optical disc reproducing device 40 and the optical disc recording device 50 are interconnected by the transmission medium 1a, on which are transmitted analog baseband video signals and analog baseband audio signals. In this optical disc system, the supplied analog video and audio signals are copyright-controlled by the optical disc recording device 50.

The optical disc reproducing device 40 includes an MPEG decoder 21, a ticket verification unit 22, a VID encoder 41, a digital/analog converter (DAC) 24 and an output terminal 25.

The VID encoder 41 is fed with the picture data decoded by the MPEG decoder 21 and with the information on the number of passes of the ticket as verified by the ticket verification unit 22. The VID encoder 41 superimposes the above ticket in the V-blanking period as the ID information. The VID encoder 41 converts the ticket into a code termed CGMS-A for superimposing the ticket. The relation of correspondence is shown in the following Table 2, in which CGMS-A equal to (1,0) and (1,1) specify "one copy" and "never copy", respectively.

TABLE 2

| ticket | watermark | CGMS-A |
| --- | --- | --- |
| three-pass | one copy | 1,0 |
| two-pass | one copy (= no more copy) | 1,1 |
| one-pass | "never copy" or "one copy" | 1,1 |
| none (including zero-pass) | (don't care, not viewed) | non-reproducible (conversion unnecessary) |

The optical disc reproducing device 40 sends analog baseband video signals and analog baseband audio signals to the optical disc recording device 50 over the transmission medium 1a. The copyright control information is superimposed by watermark processing on the video signals transmitted from the optical disc reproducing device 40, while the ticket information is superimposed in the blanking period of the video signals as VID.

Thus, the present optical disc reproducing device 40 superimposes the ticket recorded as digital data by watermark processing on the speech signals and converts the resulting data into a signal configuration that enables transmission as analog signals.

The optical disc recording device 50 includes an input terminal 31, a VID detection unit 51, video watermark (WM) detection unit 33, a verification unit 52 and the recording unit 36.

The VID detection unit 51, fed with the input video signals, detects the ticket data superimposed in the blanking period of the video signals and the contents indicated in the ticket data, and sends the detected data to the verification unit 52.

The video watermark (WM) detection unit 33, fed with input video signals, detects the copyright control information superimposed on the video signals and the contents specified by the copyright control information to send the detected contents to the verification unit 52.

The verification unit 52 verifies whether the input video signals indicates "one copy" and whether or not the ticket is the three-pass ticket. If the copyright control information reading "one copy" is superimposed on the video signals, and the three-pass ticket is superimposed on the audio signals, the verification unit 52 decrements the number of the ticket passes by one and sends the pass information to the verification unit 52.

The VID detection unit 51 rewrites the ticket superimposed on the blanking period of the video signals from the three-pass ticket to the two-pass ticket. At this time, the copyright control information is not rewritten and hence is still "one copy".

The recording unit 36 is fed with the audio signals entering the input terminal 31 and with the video signals sent from the VID detection unit 51. The recording unit 36 records video signals, on which are superimposed the copyright control information reading "one copy" and two-pass ticket data in the blanking period, and audio signals, on the rewritable disc RW.

If "copy free" is detected as the copyright control information, the optical disc recording device 50 directly records the picture data on the rewritable disc RW without rewriting the copyright control information. On the other hand, if "never copy" is detected as the copyright control information, the optical disc recording device 50 terminates the recording operation. If "one copy" is detected as the copyright control information and the two-pass, one-pass or zero-pass ticket, for example, is detected, the optical disc recording device 50 terminates the recording operation, as indicated by the contents of Table 2.

Thus, by rewriting the three-pass ticket superimposed on the audio signals into two-pass signals and recording the latter signals on the rewritable disc RW, the optical disc recording device 50 is able to perform generation management of the transmitted analog baseband signals.

With the above-described optical disc system 2, as described above, generation management can be realized even if the picture data etc, in which the ticket information is written as digital data, is converted to analog baseband signals.

Figure 6:
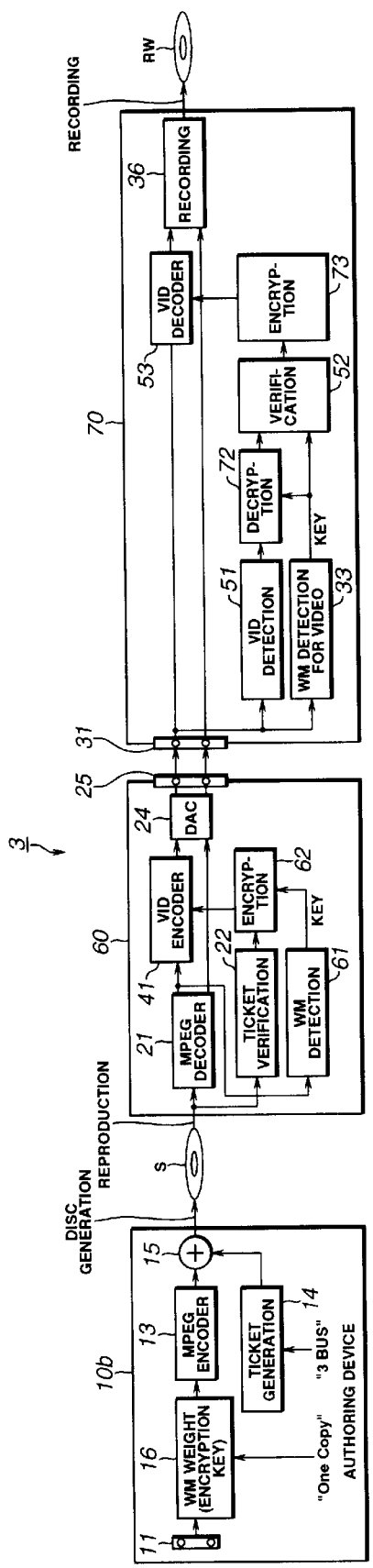
FIG. 6 is a block diagram of an optical disc system according to a third embodiment of the present invention.

The optical disc system of the third embodiment is hereinafter explained with reference to FIG. 6.

The reproducing unit 11 of the authoring device 10b reproduces the picture and audio data recorded on the master tape to send the reproduced data to the WM superimposition unit 12.

The WM superimposition unit 12 superimposes the copyright control information, as set by the contents purveyor, on the picture data or on the speech data, using watermark processing. It is assumed here that the WM superimposition unit 16 superimposes "one copy" as the copyright control information on the picture data by watermark processing. The WM superimposition unit 12 also superimposes an encryption key for ticket detection by watermark processing on the picture data along with the copyright control information. The watermark superimposing unit 12 sends the picture data etc to the MPEG encoder 13.

The authoring device 10b writes an output stream from the synthesis unit 15 to produce source discs S distributed in large quantities among the users. The encryption key at this time is superimposed on the source discs S along with the copyright control information.

The optical disc system 3 is made up of an optical disc reproducing device 60, an optical disc reproducing device 70 and a transmission medium 1a for analog interconnection therebetween. In this optical disc system 3, the optical disc reproducing device 60 reproduces the picture data and the audio data from the source disc S furnished by the authoring device 10b, while the optical disc recording device 70 records the picture data and the speech data reproduced by the optical disc reproducing device 60 on the rewritable disc RW. Also, with the present optical disc system 3, the optical disc reproducing device 60 and the optical disc recording device 70 are interconnected by the transmission medium 1a, on which are transmitted analog baseband video signals and analog baseband audio signals. In this optical disc system, the supplied analog video and audio signals are copyright-controlled by the optical disc recording device 70.

The optical disc reproducing device 60 includes an MPEG decoder 21, a ticket verification unit 22, a WM detection unit 61, an encrypting unit 62, a VID encoder 41, a digital/analog converter (DAC) 24 and an output terminal 25.

The WM detection unit 61 is fed with picture data expanded by the MPEG decoder 21. The WM detection unit 61 detects the encrypted key superimposed on the picture data by watermark processing to send the detected encrypted key to the encrypting unit 62.

The encrypting unit 62 is fed with the pass information of the ticket from the ticket verification unit 22. The encrypting unit 62 encrypts the ticket pass information using the above-mentioned encrypting key. The encrypted ticket pass information is sent to the VID encoder 41.

The VID encoder 41 is fed with picture data decoded by the MPEG decoder 21 and with the information on the number of passes of the encrypted ticket as verified by the ticket verification unit 22. The VID encoder 41 superimposes the above-mentioned encrypted ticket in the V-blanking period as the ID information.

The optical disc reproducing device 60 sends the analog baseband video signals and the analog baseband audio signals to the optical disc recording device 70 over the transmission medium 1a. The copyright control information is superimposed by watermark processing on the video signals transmitted from the optical disc reproducing device 60. The ticket information, encrypted as the VID during the blanking period, is superimposed on the video signals.

Thus, with the present optical disc reproducing device 60, the ticket recorded as digital data is superimposed by watermark processing on the speech signals and converted to a configuration which permits transmission as analog signals.

On the other hand, the optical disc recording device 70 includes an input terminal 31, a VID encoder 51, a video watermark (WM) detection unit 71, a decrypting unit 72, a verification unit 52, an encryption unit 73, a VID encoder 53 and the recording unit 36.

The VID detection unit 51, fed with the input video signals, detects the encrypted ticket data superimposed in the blanking period of the video signals, and sends the detected data to the decrypting unit 72.

The video watermark (WM) detection unit 71, fed with input video signals, detects the copyright control information superimposed on the video signals by watermark processing and detects the contents specified by the copyright control information to send the detected contents to the verification unit 52. The video watermark (WM) detection unit 71 detects the encrypting key, superimposed on the video signals, by watermark processing, and sends the encrypting key to the decrypting unit 72 and to the encryption unit 73.

The decrypting unit 72 decrypts the encrypted ticket data, detected by the VID detection unit 51, using the encrypting key. The decrypted ticket data is sent to the verification unit 52.

The verification unit 52 verifies whether or not the copyright control information denotes "one copy" and whether or not the number of ticket passes is three. If the copyright control information "one copy" is superimposed on the video signals, and the three-pass ticket is superimposed on the audio signals, the verification unit 52 decrements the ticket pass number by one to send the resulting pass information to the encryption unit 73.

The encryption unit 73 encrypts the ticket pass information using the encrypting key detected by a WM detection unit 71. The encrypted ticket pass information is sent to the VID encoder 53.

Thus, the optical disc recording device 70 rewrites the three-pass ticket, superimposed on the audio signals, to a two-pass ticket, to record it on the rewritable disc RW, in order to perform generation management of the transmitted analog baseband signals.

With the present third embodiment of the optical disc system 3, generation management is enabled even if the picture data etc, having the ticket information written in digital data, is converted to the analog baseband signals. Also, the present third embodiment of the optical disc system 3 is high in security because the ticket data is encrypted and superimposed in the blanking period of the video signals.

Figure 7:
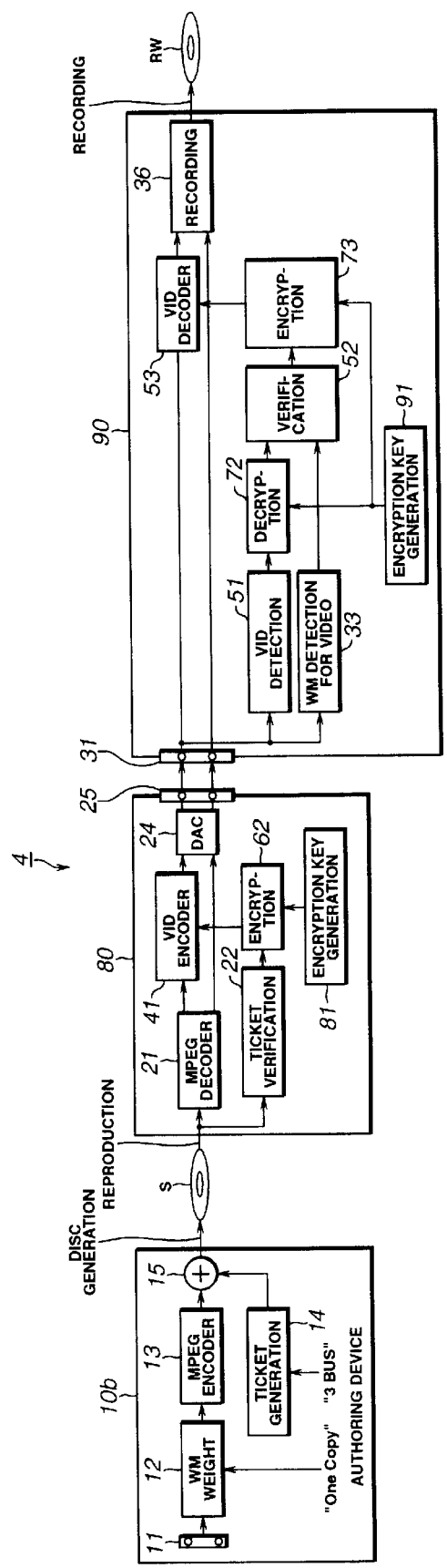
FIG. 7 is a block diagram of an optical disc system according to a fourth embodiment of the present invention.

Referring to FIG. 7, a fourth embodiment of the optical disc system is explained.

The authoring device 10*a* writes an output stream of the synthesis unit 15 on the optical disc to produce a source disc S distributed in large quantities among users.

The optical disc system 4 is made up of an optical disc reproducing device 80, an optical disc reproducing device 90 and a transmission medium 1*a* for analog interconnection therebetween. In this optical disc system 4, the optical disc reproducing device 80 reproduces the picture data and the audio data from the source disc S furnished by the authoring device 10*a*, while the optical disc recording device 90 records the picture data and the speech data reproduced by the optical disc reproducing device 80 on the rewritable disc RW. Also, with the present optical disc system 4, the optical disc reproducing device 80 and the optical disc recording device 90 are interconnected by the transmission medium 1*a*, on which are transmitted analog baseband video signals and analog baseband audio signals. In this optical disc system, the supplied analog video and audio signals are copyright-controlled by the optical disc recording device 90.

The optical disc reproducing device 80 includes an MPEG decoder 21, a ticket verification unit 22, an encrypting key generating unit 81, an encrypting unit 62, a VID encoder 41, a digital/analog converter (DAC) 24 and an output terminal 25.

The encrypting key generating unit 81 generates an encrypting key proper to the optical disc reproducing device 80 to send the generated encrypting key to the encrypting unit 62.

The optical disc reproducing device 80 sends the analog baseband video signals and analog baseband audio signals over the transmission medium 1*a* to the optical disc recording device 90. On the video signals transmitted from the optical disc reproducing device 80 is superimposed the copyright control information by watermark processing. In the blanking period of these video signals is superimposed the ticket information encrypted as the VID.

Thus, the present optical disc reproducing device 80 superimposes the ticket, recorded as the digital data, on the speech signals by watermark processing for conversion to the configuration that permits transmission as analog signals.

On the other hand, the optical disc recording device 90 includes an input terminal 31, a VID detection unit 51, a video WM detection unit 33, an encrypting key generating unit 91, the decrypting unit 72, the verification unit 52, an encrypting unit 73, a VID encoder 53 and the recording unit 36.

The VID detection unit 51 is fed with the input video signals to detect the encrypted ticket data superimposed in the blanking period of these video signals to send the detected ticket data to the decrypting unit 72.

The video WM detection unit 33 is fed with input video signals and detects the copyright control information superimposed on these video signals by watermark processing and the contents indicated by the copyright control information to send the detected information and contents to the verification unit 52.

An encryption key generating unit 91 generates an encrypting key proper to the optical disc reproducing device 80 to send the generated encrypting key to the decrypting unit 72 and to the encrypting unit 62.

The decrypting unit 72 decrypts the encrypted ticket data, detected by the VID detection unit 51, using the encrypting key. The decrypted ticket data is sent to the verification unit 52.

The verification unit 52 verifies whether or not the copyright control information denotes "one copy" and whether or not the number of ticket passes is three. If the copyright control information "one copy" is superimposed on the video signals, and the three-pass ticket is superimposed on the audio signals, the verification unit 52 decrements the ticket pass number by one to send the resulting pass information to the encryption unit 73.

The encryption unit 73 encrypts the ticket pass information using the encrypting key generated by the encrypting key generating unit 91. The encrypted ticket pass information is sent to the VID encoder 53.

Thus, the optical disc recording device 90 rewrites the three-pass ticket, superimposed on the audio signals, to a two-pass ticket, to record it on the rewritable disc RW, in order to perform generation management of the transmitted analog baseband signals.

With the present fourth embodiment of the optical disc system 4, generation management is enabled even if the picture data etc, having the ticket information written in digital data, is converted to the analog baseband signals. Also, the present fourth embodiment of the optical disc system 4 is high in security because the ticket data is encrypted and superimposed in the blanking period of the video signals.

What is claimed is:

1. A signal reproducing apparatus comprising:
    receiving/reproducing means for receiving or reproducing digital data transmitted via a transmission medium or recorded on a recording medium, said digital data containing a main stream and a sub-stream, said main stream being original digital signals having copyright control information for copying limitation superimposed thereon by watermark processing and said sub-stream being generation limitation information specifying the number of times of possible copying or reproduction;
    generation limitation information superimposition means for detecting the generation limitation information and superimposing the detected generation limitation information on said original digital signals to form combined original digital signals;
    conversion means for converting the combined original digital signals into analog baseband signals; and outputting means for outputting the analog baseband signals.

2. The signal reproducing apparatus according to claim 1 wherein said generation limitation information superimposition means superimposes the detected generation limitation information on said original digital signals by watermark processing of a system different from that of the copyright control information.

3. The signal reproducing apparatus according to claim 1 wherein said generation limitation information superimposing means superimposes the detected generation limitation information by watermark processing on signals different from those on which is superimposed the copyright control information for copying limitation.

4. The signal reproducing apparatus according to claim 1 wherein said original digital signals are video signals and wherein said generation limitation information superimposing means superimposes the detected generation limitation information in the blanking period of said video signals.

5. The signal reproducing apparatus according to claim 4 wherein encrypting key information is superimposed by watermark processing on said original digital signals and wherein said generation limitation information superimposition means detects said encrypting key information and encrypts the generation limitation information using said encrypting key information to superimpose the encrypted generation limitation information in the blanking period of said video signals.

6. The signal reproducing apparatus according to claim 4 wherein said generation limitation information is encrypted using unique encrypted key information and is superimposed in the blanking period of said video signals.

7. A signal reproducing method comprising:

receiving or reproducing digital data transmitted via a transmission medium or recorded on a recording medium, said digital data containing a main stream and a sub-stream, said main stream being original digital signals having the copyright control information for copying limitation superimposed thereon by watermark processing and said sub-stream being the generation limitation information specifying the number of times of possible copying or reproduction;

detecting the generation limitation information and superimposing the detected generation limitation information on said original digital signals to form combined original digital signals;

converting the combined original digital signals into analog baseband signals; and outputting the analog baseband signals.

8. The signal reproducing method according to claim 7 wherein the detected generation limitation information is superimposed on said original digital signals by watermark processing of a system different from that of the copyright control information for copying limitation.

9. The signal reproducing method according to claim 7 wherein the detected generation limitation information is superimposed by watermark processing on signals different from those on which is superimposed the copyright control information for copying limitation.

10. The signal reproducing method according to claim 7 wherein the original digital signals are video signals and wherein the detected generation limitation information is superimposed in the blanking period of said video signals.

11. The signal reproducing method according to claim 10 wherein encrypting key information is superimposed by watermark processing on said original digital signals and wherein said encrypting key information is detected to encrypt the generation limitation information using said encrypting key information to superpose the encrypted generation limitation information in the blanking period of said video signals.

12. The signal reproducing method according to claim 10 wherein said generation limitation information is encrypted using unique encrypted key information and superimposed in the blanking period of said video signals.

13. A signal recording apparatus comprising:

input means supplied with analog video signals and analog audio signals being original signals, one of said analog video signals and said analog audio signals having copyright control information for copying limitation superimposed thereon by watermark processing and the other of said analog video signals and said analog audio signals having generation limitation information superimposed thereon which specifies the number of times of possible copying or reproduction;

recording means for recording said analog signals on the recording medium;

detection means having (i) audio detection means for receiving said analog audio signals and for detecting therefrom the appropriate one of the copyright control information and the generation limitation information, and (ii) and video detection means for receiving said analog video signals and for detecting therefrom the other one of the copyright control information and the generation limitation information;

generation limitation information superimposition means for superimposing updated generation limitation information on one of said analog video signals and said analog audio signals for recording; and recording limiting means for verifying, based on the copyright control information and the generation limitation information detected from said analog audio signals and said analog video signals, whether or not the original signals are recordable, said recording limiting means terminating the recording operation by said recording means if the original signals are verified to be unrecordable on the recording medium, said recording limiting means permitting the recording operation to be performed by said recording means with the generation limitation information updated by one generation by said generation limitation information superimposing means being superimposed on the analog signals if the original signals are verified to be recordable.

14. A signal recording method comprising:

receiving analog video signals and analog audio signals being original signals, one of said analog video signals and said analog audio signals having copyright limitation information for copying limitation superimposed thereon by watermark processing and the other of said analog video signals and said analog audio signals having generation limitation information specifying the number of times of possible copying or reproduction superimposed thereon;

receiving said analog audio signals and detecting therefrom the appropriate one of the copyright control information and the generation limitation information by use of audio detection means, and receiving said analog video signals and detecting therefrom the other one of the copyright control information and the generation limitation information by use of video detection means; and verifying, based on the copyright control information and the generation limitation information detected from said analog audio signals and said analog video signals, whether or not the original signals are recordable on a recording medium, the recording operation being terminated if the original signals are verified to be unrecordable, the recording operation being permitted to be performed with the generation limitation information updated by one generation being superimposed on the analog signals if the original signals are verified to be recordable.

15. A system comprising:

a signal reproducing apparatus including receiving/reproducing means for receiving or reproducing digital data transmitted via a transmission medium or recorded on a recording medium, said digital data containing a main stream and a substream, said main stream being original digital signals having copyright control information for copying limitation superimposed thereon by watermark processing and said sub-stream being generation limitation information specifying the number of times of possible copying or reproduction, generation limitation information superimposition means for detecting the generation limitation information and superimposing the detected generation limitation information on said original digital signals to form combined original digital signals, conversion means for converting the combined original digital signals into analog baseband signals, and outputting means for outputting the analog baseband signals, and a signal recording apparatus including input means supplied with analog baseband signals from output means of said reproducing apparatus, recording means for recording said analog baseband signals on the recording medium, copyright control information detection means for detecting the copyright control information, generation limitation information detection means for detecting the generation limitation information, second generation limitation information superimposition means for superimposing the generation limitation information on analog baseband signals for recording, and recording limiting means for verifying whether or not the original signals are recordable, said recording limiting means terminating the recording operation by said recording means if the original signals are verified to be unrecordable on the recording medium, said recording limiting means permitting the recording operation to be performed by said recording means with the generation limitation information updated by one generation by said second generation limitation information superimposing means being superimposed on the analog baseband signals if the original signals are verified to be recordable.

16. A method comprising the steps of:

receiving or reproducing digital data transmitted via a transmission medium or recorded on a recording medium, said digital data containing a main stream and a substream, said main stream being digital original signals having copyright control information for copying limitation superimposed thereon by watermark processing and said sub-stream being generation limitation information specifying the number of times of possible copying or reproduction;

detecting the generation limitation information and superimposing the detected generation limitation information on said original digital signals to form combined original digital signals;

converting said combined original signals into analog baseband signals;

transmitting the analog baseband signals;

receiving the analog baseband signals;

detecting the copyright control information from the received analog baseband signals;

detecting the generation limitation information from said analog baseband signals; and verifying whether or not the original digital signals are recordable on a recording medium, the recording operation by said recording means being terminated if the original digital signals are verified to be unrecordable, the recording operation being permitted to be performed with the generation limitation information updated by one generation being superimposed on the analog baseband signals if the original signals are verified to be recordable.

\* \* \* \* \*